United States Patent
Melencio et al.

(10) Patent No.: US 11,162,521 B2
(45) Date of Patent: Nov. 2, 2021

(54) APPARATUS FOR FASTENING AND/OR ALIGNING OBJECTS

(71) Applicant: HYTORC Division UNEX Corporation, Mahwah, NJ (US)

(72) Inventors: Jean Paul Melencio, Bethlehem, NJ (US); Ulrich Wilhelm Oehms, Kottenheim (DE); Stefan Ebler, Rosendahl-Darfe (DE)

(73) Assignee: HYTORC Division UNEX Corporation, Mahwah, NJ (US)

( * ) Notice: Subject to any disclaimer, the term of this patent is extended or adjusted under 35 U.S.C. 154(b) by 53 days.

(21) Appl. No.: 16/326,094

(22) PCT Filed: Aug. 16, 2017

(86) PCT No.: PCT/US2017/047218
§ 371 (c)(1),
(2) Date: Feb. 15, 2019

(87) PCT Pub. No.: WO2018/035264
PCT Pub. Date: Feb. 22, 2018

(65) Prior Publication Data
US 2019/0211855 A1    Jul. 11, 2019

Related U.S. Application Data

(60) Provisional application No. 62/375,682, filed on Aug. 16, 2016.

(51) Int. Cl.
*F16B 13/06* (2006.01)
*F16B 5/02* (2006.01)
(Continued)

(52) U.S. Cl.
CPC .............. *F16B 5/0258* (2013.01); *F16B 2/04* (2013.01); *F16B 3/06* (2013.01); *F16B 4/004* (2013.01); *F16B 5/025* (2013.01); *F16B 29/00* (2013.01)

(58) Field of Classification Search
CPC .......... F16B 29/00; F16B 5/0258; F16B 2/04; F16B 5/025
(Continued)

(56) References Cited

U.S. PATENT DOCUMENTS

| 1,767,019 A | * | 6/1930 | Sergeeff | F16B 5/025 411/57.1 |
| 2,699,589 A | * | 1/1955 | Redell | B66C 1/48 294/102.1 |

(Continued)

*Primary Examiner* — Gary W Estremsky
(74) *Attorney, Agent, or Firm* — Justin B. Bender, Esq.

(57) ABSTRACT

The invention provides a radially expanding fastener/alignment plug assembly for use with a torque power tool, the assembly including: a sleeve member (10), insertable into a hole of an object, having radial expansion elements with inner surface portions which are tapered towards a first end; an expanding member (20), insertable in the sleeve member, having an outer surface portion which is tapered towards a first end, cooperating with the inner tapered surface portions of the radial expansion elements of the sleeve member; and a displacement member (30) formed between a second end of the sleeve member and a second end of the expanding member. Advantageously, the assembly is self-reacting allowing an actuation torque to be applied to and reacted upon to create high levels of pulling and expansion force without the need for an external reaction point.

9 Claims, 2 Drawing Sheets

(51) Int. Cl.
    *F16B 29/00*     (2006.01)
    *F16B 2/04*     (2006.01)
    *F16B 3/06*     (2006.01)
    *F16B 4/00*     (2006.01)

(58) Field of Classification Search
    USPC .......................................... 411/24, 26, 60.1
    See application file for complete search history.

(56) References Cited

U.S. PATENT DOCUMENTS

| | | | | | |
|---|---|---|---|---|---|
| 3,614,140 | A * | 10/1971 | Nestor | ............... | F16B 21/20 403/369 |
| 3,884,099 | A * | 5/1975 | Sikstrom | ............... | F16B 13/068 411/51 |
| 4,600,334 | A * | 7/1986 | Soussloff | ............... | F16D 1/094 242/573 |
| 4,799,841 | A * | 1/1989 | Ramsbro | ............... | F16B 13/066 411/55 |
| 5,374,145 | A * | 12/1994 | Mairesse | ............... | F01D 5/3023 29/525.11 |
| 5,775,831 | A * | 7/1998 | Mullenberg | ............... | F16B 2/14 403/337 |
| 8,057,145 | B2 * | 11/2011 | Dolan | ............... | F16B 5/0258 411/57.1 |
| 8,348,566 | B2 * | 1/2013 | Pratt | ............... | F16B 19/1063 411/38 |
| 8,496,394 | B2 * | 7/2013 | Schneider | ............... | F16B 5/02 403/370 |
| 2004/0022596 | A1 * | 2/2004 | Belanger | ............... | F16B 19/1063 411/34 |
| 2004/0231467 | A1 * | 11/2004 | Hufnagl | ............... | F16B 23/0061 81/55 |

\* cited by examiner

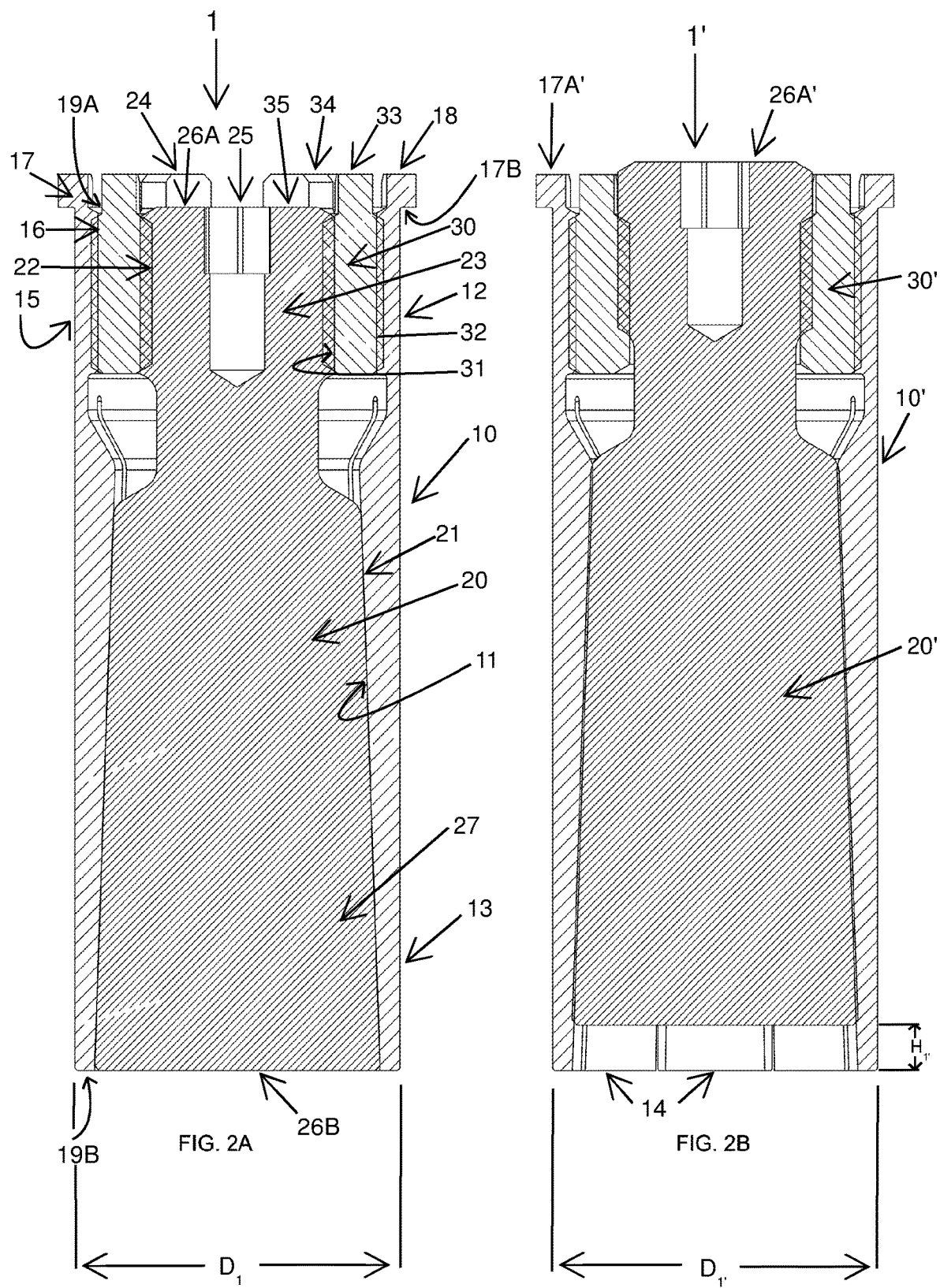

APPARATUS FOR FASTENING AND/OR ALIGNING OBJECTS

CROSS REFERENCE TO RELATED APPLICATION

This Application is a continuation application of and claims priority to U.S. Application Ser. No. 62/375,682, having Filing Date of 16 Aug. 2016, entitled "RADIAL EXPANDING ALIGNMENT PLUG", an entire copy of which is incorporated herein by reference.

BACKGROUND OF INVENTION

The present invention relates to fastening and alignment assemblies for mechanical couplings, and in particular to radially expanding fastening and alignment assemblies.

Radially expanding fastening and alignment assemblies are known in the art. Known radially expanding fastening and alignment assemblies include an outer tubular expansible element formed as a sleeve with an inner tapered portion and a mating inner expanding element formed as an inner stud with an outer tapered portion cooperating with the tapered portion of the sleeve. The outer sleeve is inserted in a hole of an object to be tensioned, for example two adjoining flanges to be connected with one another. After this, the inner stud is inserted into the outer sleeve and pulled by external means to force the tapered portions to slide over one another and therefore to expand the outer sleeve. Presently, hydraulic tools or a plurality of jack screws are used as external means for applying a tensile load to radially expanding fastening and alignment assemblies known in the art.

Applicant's affiliate, JETYD Corporation, improved upon radially expanding fastening and alignment assemblies in its U.S. Pat. No. 8,057,145, having Issue Date of 15 Nov. 2011, entitled, "RADIALLY EXPANDING BOLT ASSEMBLY", an entire copy of which is incorporated herein by reference. U.S. Pat. No. 8,057,145 discloses a radially expanding bolt assembly having a hollow element insertable into a hole of an object and having an inner surface with at least one inner surface portion which is tapered, an expanding element insertable in the hollow element and having an outer surface with at least one outer surface portion which is tapered and cooperates with the inner tapered surface portion of the hollow element, additional elements for displacing the expanding element in opposite axial directions for tightening and loosening the bolt assembly, and a washer positionable between the object and one of the additional elements at one of the axial ends, so that the one additional element displaces the expanding element in one axial direction and due to cooperation of the tapered surface portions expands the hollow element to clamp it in the hole of the object, while the other additional element displaces the expanding element in an opposite axial direction and the tapered surface portions disengage from one another so that the hollow element contracts and the radially expanding bolt assembly can be removed from the hole of the object It is believed that the existing radially expanding fastening and alignment assemblies can be further improved.

SUMMARY OF INVENTION

According to a first aspect of the invention we provide radially expanding fastener/alignment plug assembly for use with a torque power tool, the assembly including: a sleeve member, insertable into a hole of an object, having radial expansion elements with inner surface portions which are inversely tapered towards a first end; an expanding member, insertable in the sleeve member, having an outer surface portion which is tapered towards a first end, cooperating with the inner tapered surface portions of the radial expansion elements of the sleeve member; and a displacement member formed between a second end of the sleeve member and a second end of the expanding member. The sleeve member has inner engaging formations at a second end and upper rotational coupling formations at the second end for receiving a reaction torque from the torque power tool. The expanding member has outer engaging formations at the second end. The displacement member, configured for axial displacement of the expanding member which expands the radial expansion elements of the sleeve member, has inner engaging formations cooperating with the outer engaging formations of the expanding member and outer engaging formations cooperating with the inner engaging formations of the sleeve member. Notably, either the expanding member, the displacement member or both may have upper rotational coupling formations for receiving an action torque from the torque power tool. Advantageously, the assembly is self-reacting allowing an actuation torque to be applied to and reacted upon to create high levels of pulling and expansion force without the need for an external reaction point.

BRIEF DESCRIPTION OF DRAWINGS

The present invention may be described, by way of example only, with reference to the accompanying drawings, of which:

FIG. 2A is a cross-section view showing internal parts of the assembly in a relaxed state of the present invention; and FIG. 2B is a cross-section view showing internal parts of the assembly in a tensioned state of the present invention.

DESCRIPTION OF INVENTION

Figures 1A, 1B:
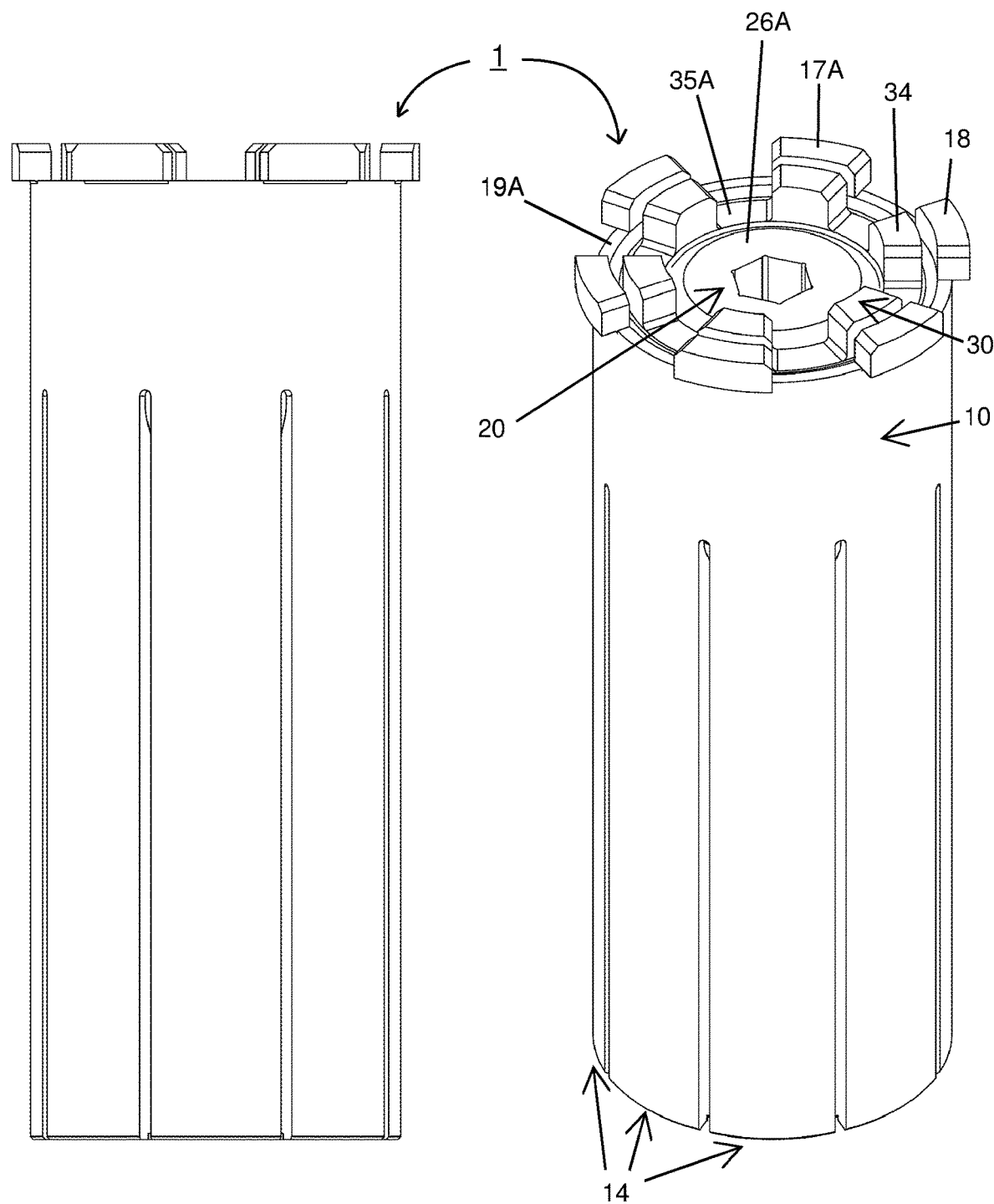
FIG. 1A is a side view of the radially expanding fastener/alignment plug assembly of the present invention.
FIG. 1B is a perspective view of the assembly of the present invention.

Referring to FIGS. 1A-2B, by way of example, a radially expanding fastener/alignment plug assembly 1 for use with a torque power tool (not shown), includes: a sleeve member 10, insertable into a hole of an object (not shown), having radial expansion elements 14 with inner surface portions 11 which are tapered towards a first end 13; an expanding member 20, insertable in sleeve member 10, having an outer surface portion 21 which is inversely tapered towards a first end 27, cooperating with inner tapered surface portions 11 of radial expansion elements 14 of sleeve member 10; and a displacement member 30 formed between a second end 15 of sleeve member 10 and a second end 23 of expanding member 20. Sleeve member 10 has inner engaging formations 16 at second end 15 and upper rotational coupling formations 18 at second end 15 for receiving a reaction torque from the torque power tool. Expanding member 20 has outer engaging formations 22 at second end 23. Displacement member 30, configured for axial displacement of expanding member 20 which expands radial expansion elements 14 of sleeve member 10, has inner engaging formations 31 cooperating with outer engaging formations 22 of expanding member 20 and outer engaging formations 32 cooperating with inner engaging formations 16 of sleeve member 10. Notably, either expanding member 20, displacement member 30 or both may have upper rotational coupling formations 25 and 34, respectively, for receiving an action torque from the torque power tool. Advantageously, assembly 1 is self-reacting allowing an actuation torque to be applied to and reacted upon to create high levels of pulling and expansion force without the need for an external reaction point.

The following discussion relates to an exemplary embodiment of the present invention shown in FIGS. 1A-2B. Engaging formations 16, 22, 31 and 32 include threads. In this case, the thread engagement between engaging formations 22 and 31 and the thread engagement between engaging formations 16 and 32 may be formed of either a different thread pitch, a different thread direction, or both a different thread pitch and a different thread direction. Displacement member 30 includes a double threaded nut, which is configured for axial displacement of expanding member 20 which expands radial expansion elements 14 of sleeve member 10. Expanding member 20 includes a stud. Rotational coupling formations 18 and 25 include polygonal formation, namely castellation.

An industrial bolting apparatus is further disclosed and includes a torque power tool (not shown) either electrically, hydraulically, manually or pneumatically driven which tightens radially expanding fastener/alignment plug assembly 1.

Put another way, this invention relates to fastening and alignment systems for mechanical couplings. It discloses a plug that will expand radially allowing a coupling assembler to index or align mating holes on mating flanges by expanding and thereby forcing the bores of both holes to align about the axis of this expanding fastener. The preferred embodiment is a self-reacting assembly as disclosed. The self-reacting assembly will allow an actuation torque to be applied and reacted within the assembly making is possible to use helical threads within to create high levels of pulling force without the need for an external reaction point.

This invention discloses a three component radially expanding fastener/alignment plug assembly 1. Assembly 1 includes: an expansion sleeve member 10; a tapered stud 20; and a double threaded nut 30.

Expansion sleeve member 10 will expand when tapered stud 20, having a mating tapered surface 21, is pulled through sleeve 10 by the action of torque application from a torque tool (not shown) at its mechanical threads 22. A portion 13 of expansion sleeve 10 that resides inside bores of an object to be aligned (not shown) has a tapered, or lower, surface 11 that will drive the expansion. Expansion portion 13 may have grooves, or slots 14, axially oriented in such a way to allow the expansion strain outward to occur without exceeding the material stress limits.

An upper portion 15 of expansion sleeve 10 has an internal thread 16 that will mate with double threaded nut 30. Upper portion 15 has oversized shoulders 17 which reside outside of the bores of the object to be aligned. Upper portion shoulders 17 have a rotational coupling means 18, such as, for example, castellation to provide a place for reaction torque from the housing of the torque tool when action torque is applied to double threaded nut 30. Note that, as shown in FIG. 2A, expansion sleeve 10 is taller than mating stud 20.

As shown in FIG. 2A, double threaded nut 30 has internal threads 31 and external threads 32 with opposing thread directions. An upper portion 33 of double threaded nut 30 has a rotational coupling means 34, such as, for example, castellation that will allow the application of action torque from the torque tool to double threaded nut 30. In the area of the bore being aligned, tapered surface 21 of tapered stud 20 mates with tapered internal surface 11 of expansion sleeve 10. An upper portion 23 of tapered stud 20 has an externally threaded portion 22 that mates with internal threads 31 on double threaded nut 30.

Note that, as shown in the FIGs., a top side 24 of tapered stud 20 may have a tapped hole 25 that would allow for rotational coupling with a torque tool having a different engagement means than that which mates with rotational coupling means 34.

During operation, as shown in FIG. 2A, a bottom surface 26B of tapered stud 20 is positioned flush with a bottom surface 19B of expansion sleeve 10 allowing the smallest possible diameter $D_1$ of assembly 1. A top surface 35A of double threaded nut 30 is positioned flush with a top surface 19A of expansion sleeve 10. Assembly 1 is inserted into the bore(s) of the object where the expansion and/or alignment is desired. Assembly 1 is pushed far enough into the bore(s) such that a bottom surface 17B of shoulder 17 of expansion sleeve 10 abuts the surface of the object around the bore(s).

Per FIG. 2B, the rotational torque is applied to double threaded nut 30 while reacting on rotational coupling means 18 of expansion sleeve 10, which creates an axial translation of tapered stud 20. This translation causes mating tapered surface 21 of tapered stud 20 and mating tapered surface 11 of expansion sleeve 10 to interact and cause expansion to a new wider diameter $D_{1'}$. Tensioned tapered stud 20' has axially displaced a distance $H_{1'}$ relative to expanded expansion sleeve 10' and tensioned double threaded nut 30'. Applying torque in the opposing direction to tensioned double threaded nut 30' of assembly 1' will dis-engage the mating surfaces allowing the expansion diameter to be reduced back to $D_1$ for easy removal.

Note that any suitable alternative structures and materials may be used to obtain similar results of assembly 1.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a three-piece self-reacting fastener for use with a fluid operated tool, it is not intended to be limited to the details shown, since various modifications and structural changes may be made without departing in any way from the spirit of the present invention.

When used in this specification and claims, the terms "comprising", "including", "having" and variations thereof mean that the specified features, steps or integers are included. The terms are not to be interpreted to exclude the presence of other features, steps or components.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A radially expanding fastener/alignment plug assembly for use with a torque power tool, the assembly comprising:

a sleeve member, insertable into a hole of an object, having radial expansion elements with inner surface portions which are tapered towards a first end;

an expanding member, insertable in the sleeve member, having an outer surface portion which is inversely tapered towards a first end, cooperating with the inner tapered surface portions of the radial expansion elements of the sleeve member;

a displacement member formed between a second end of the sleeve member and a second end of the expanding member;

wherein the displacement member is configured for axial displacement of the expanding member which expands the radial expansion elements of the sleeve member;

the sleeve member having upper rotational coupling formations at the second end for receiving a reaction torque from the torque power tool;

the displacement member or the expanding member having upper rotational coupling formations at the second end for receiving an action torque from the torque power tool; and wherein the rotational coupling formations include polygonal formations.

2. A radially expanding fastener/alignment plug assembly as defined in claim 1 including:

the sleeve member having inner engaging formations at a second end;

the expanding member having outer engaging formations at the second end; and the displacement member having inner engaging formations cooperating with the outer engaging formations of the expanding member and outer and outer engaging formations cooperating with the inner engaging formations of the sleeve member.

3. A radially expanding fastener/alignment plug assembly as defined in claim 2, wherein the engaging formations include threads.

4. A radially expanding fastener/alignment plug assembly as defined in claim 2, wherein the engaging formations include threads and wherein the inner and outer threads of the displacement member are formed of either a different thread pitch, a different thread direction, or both a different thread pitch and a different thread direction.

5. A radially expanding fastener/alignment plug assembly as defined in claim 1, wherein the displacement member includes a double threaded nut.

6. A radially expanding fastener/alignment plug assembly as defined in claim 1, wherein the expanding member includes a stud.

7. A radially expanding fastener/alignment plug assembly as defined in claim 1, wherein the rotational coupling formations include castellation.

8. A radially expanding fastener/alignment plug assembly as defined in claim 1, wherein the rotational coupling formations of the sleeve member include castellation and wherein the rotational coupling formations of the expanding member include a tapped polygonal hole.

9. A system comprising a radially expanding fastener/alignment plug assembly as defined in claim 1 and an industrial bolting apparatus including a torque power tool either electrically, hydraulically, manually or pneumatically driven which tightens the plug assembly.

* * * * *